INVENTOR.
LAWRENCE A. KAUFMAN
BY McCormick, Paulding & Huber
ATTORNEYS

Feb. 13, 1968 L. A. KAUFMAN 3,369,161
HARD-OVER ATTENUATION DEVICE FOR SERVO SYSTEM
Filed May 7, 1964 3 Sheets-Sheet 2

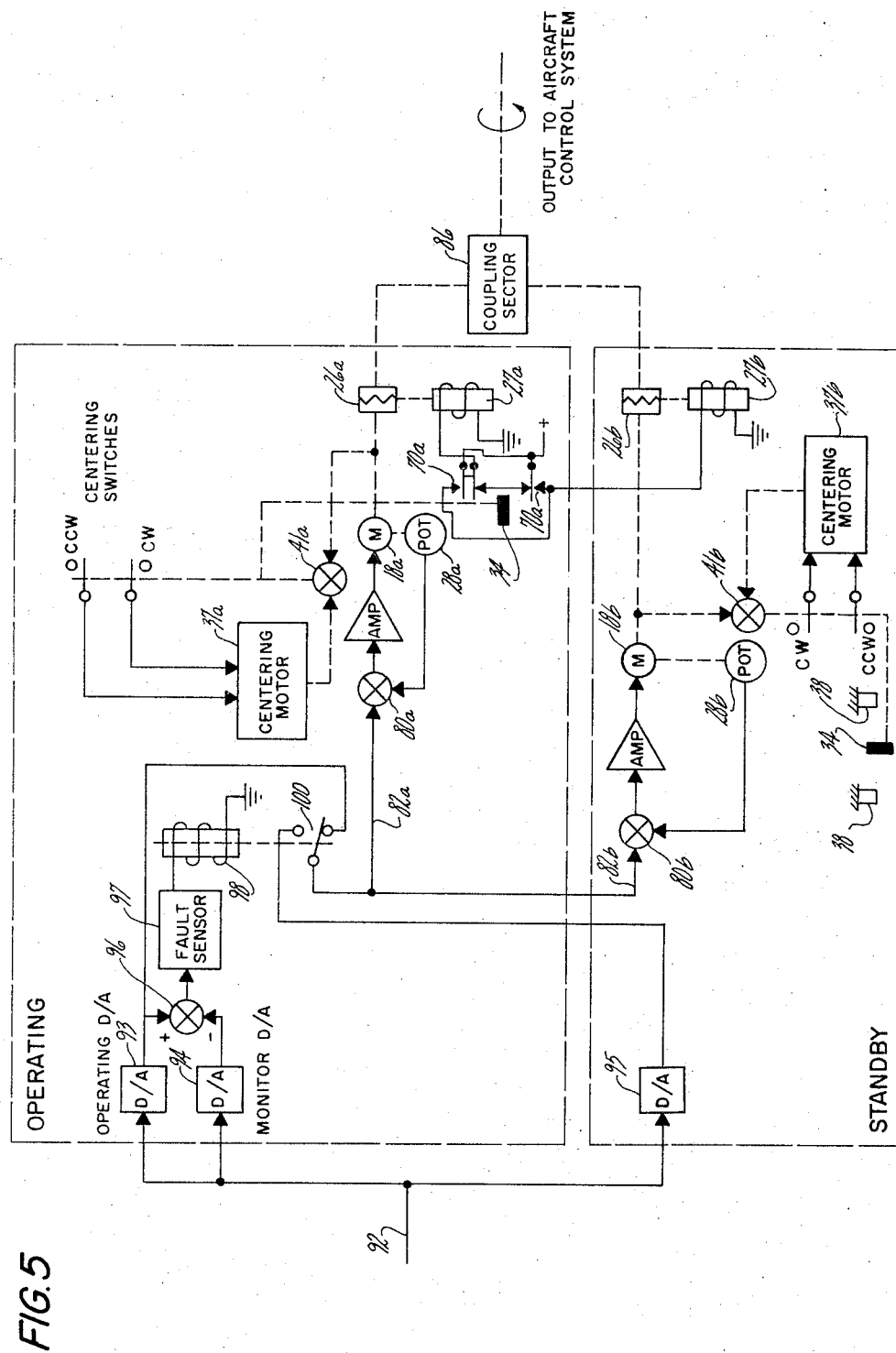

United States Patent Office 3,369,161
Patented Feb. 13, 1968

3,369,161
HARD-OVER ATTENUATION DEVICE FOR
SERVO SYSTEM
Lawrence A. Kaufman, West Hartford, Conn., assignor
to Kaman Aircraft Corporation, Bloomfield, Conn., a
corporation of Connecticut
Filed May 7, 1964, Ser. No. 365,725
13 Claims. (Cl. 318—18)

ABSTRACT OF THE DISCLOSURE

In a servo motor for positioning a control surface of an airplane, operation at a sustained high rate of speed is prevented, to prevent an accompanying hard-over maneuver of the airplane, by an accompanying means including a pair of spaced stops for mechanically limiting the range of movement of the servo motor. An arm drivingly connected with the output of the servo motor is located between the two stops and is engageable with the stops to perform the motion limiting function. A centering motor is also drivingly connected with the arm through a mechanical differential to adjust the permitted range of movement relative to a given position of the servo motor output member and accordingly to a given position of the control surface. Two switches define another zone of arm movement located between the two stops and actuate the centering motor whenever the arm moves beyond such zone, the centering motor acting to adjust the permitted range of movement toward the arm at a relatively slow rate. As a result, rapid operation of the servo motor for a short period of time is permitted, as well as slow operation for long periods of time, but sustained rapid operation is prevented by engagement of the arm with one or the other of the stops As an alternative the two mechanical stops may be omitted or accompanied by a second set of switches for deactivating the servo motor when the arm reaches one limit of its permitted range of movement.

This invention relates to servo sysems wherein a servo motor or actuator is employed to move a given part in response to a signal applied thereto, and deals more particularly with a device for limiting or attenuating the output of the servo motor or actuator in the event of a signal applied thereto commanding a sustained high speed output.

Although not limited thereto, the device of the present invention finds particular utility in connection with servo systems used in aircraft or other vehicles for mechanically positioning the ailerons, rudder or similar flight control members. In such systems the servo actuators usually have high gain amplifiers associated therewith which are arranged to accept signal inputs proportional to the deviation of the vehicle from a desired orientation. Now, in order for the servo system to be able to maintain the vehicle in a stable condition, it is necessary that the servo system have a natural frequency which is substantially higher, for example five to ten times greater, than the natural frequency of the aircraft in the mode of flight under consideration. This high responsiveness of the servo actuator is, however, required only for relatively small dynamic displacements of the vehicle, and with regard to large long term trim variations the servo actuator can be operated at a relatively slow rate. That is, it is necessary that the servo actuator have a high rate of response over only a relatively small range of travel, yet it is also necessary that the servo actuator be capable of movement over a relatively larger range of movement in order to make long term trim adjustments. In most servo actuators presently in use the high responsiveness of the device is not limited to any small range of travel and instead the device at all times exhibits a high responsiveness over its full range of travel. As a consequence the system responds very rapidly to signals calling for large displacements, as may occur by malfunctioning of the auto pilot for example, and moves the associated final control element rapidly to the limit of its movement so as to place the aircraft in jeopardy by causing abrupt changes in attitude, acceleration or the like. Any such large and suden change in one of the flight characteristics of an aircraft is referred to as a hard-over maneuver, or more simple a "hard-over."

One object of this invention is therefore to provide a means for preventing a hard-over maneuver in an aircraft or other vehicle employing a servo actuator for positioning the ailerons, rudder or other final control element.

Another object of this invention is to provide a device for use in conjunction with a servo actuator for limiting the duration of the high speed operation of the actuator.

A still further object of this invention is to provide a redundant contro system for use in an aircraft or other vehicle, the system including two servo actuators and means for activating one actuator and deactivating the other actuator in response to high speed operation of the latter actuator for some period of time at a speed exceeding a predetermined maximum desirable speed.

A still further object of this invention is to provide a hard-over attenuation device for use in connection with a servo actuator and wherein the operation of the actuator is mechanically prevented from exceeding the limits of its range of high response operation.

Another object of this invention is to provide a hard-over attenutaion device of the character defined in the preceding paragraph which is of a relatively simple construction and wherein all the switches and other electrical components are stationary with respect to the aircraft so as to eliminate the need for complicated rotating contacts or slip rings.

Other objects and advantages of the invention will be apparent from the following description and from the drawings forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 5 is a block diagram of a redundant control system employing the elements shown in FIG. 4.

Figure 1:
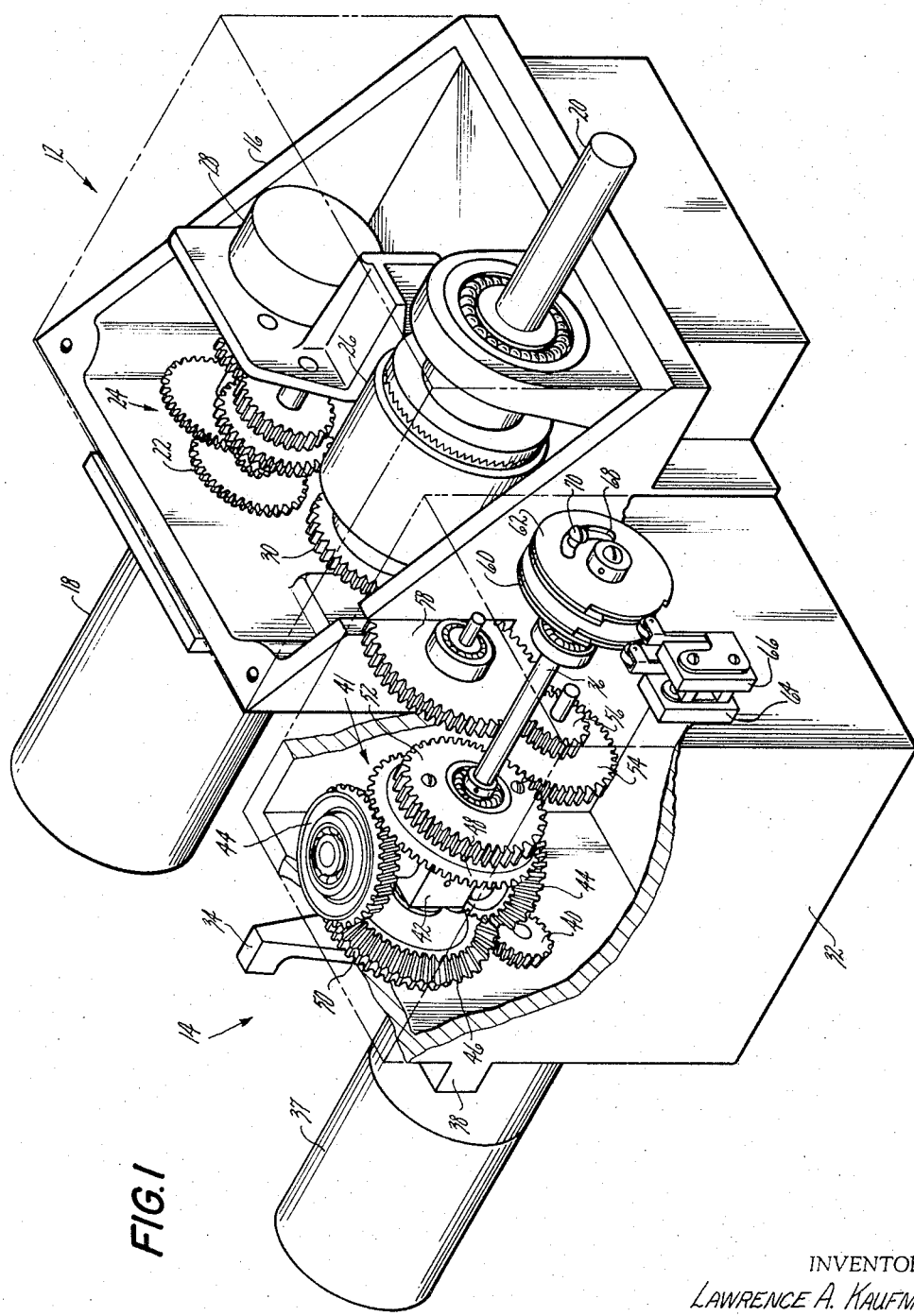
FIG. 1 is a perspective view of a servo actuator having combined therewith a hard-over attenuation device embodying the present invention, various portions of the housings for the actuator and hard-over attenuation device being shown in phantom and other parts being omitted to show more clearly the construction and arrangement of other parts.
Figure 2:
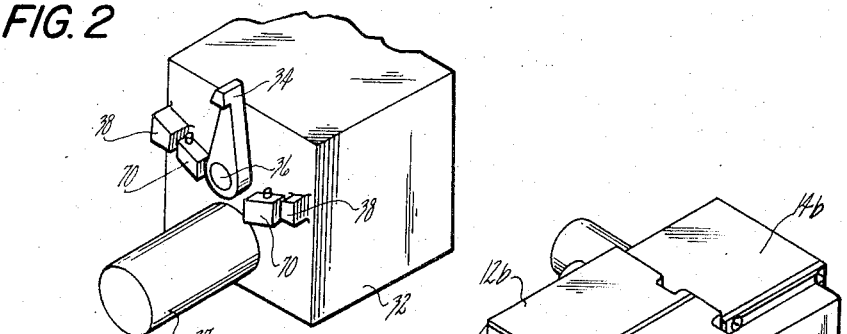
FIG. 2 is a perspective view on a reduced scale showing the rear end of the hard-over attenuation device of FIG. 1.

Turning now to the drawings, and first considering FIGS. 1 and 2, these figures show a servo actuator assembly, indicated generally as 12, combined with a hard-over attenuation device indicated generally at 14. Considering first the servo actuator assembly 12, this assembly is or may be of generally conventional construction and comprises a housing 16, a servo motor or actuator 18, and an output shaft 20. The motor 18 is located generally outside of the housing 16 and includes an output member which may be taken to be the gear shown at 22 in FIG. 1. The gear 22 is in turn drivingly connected with the output shaft 20 by means of speed reduction gearing, indicated generally at 24, and by an electro-mechanical clutch 26. The speed reduction gearing 24 and the clutch 26 are located within the housing 16, and also in the housing and driven by the gearing 24 is a potentiometer or other shaft encoder 28 which may be used to provide a signal for the control system indicating the position of the output member of the servo motor 18. The clutch 26 includes a gear 30 which meshes with one of the gears of the gearing 24 and also includes a self-contained solenoid 27 (FIG. 3) which may be energized or de-energized to establish or break, respectively, a driving connection between the gear 30 and the output shaft 20.

Turning next to the hard-over attenuation device 14, this device comprises a housing 32 mounted adjacent the housing 16 as shown in FIG. 1. An arm 34 is supported for movement about an axis fixed relative to the housing. In the illustrated case, this axis is defined by a shaft 36 which extends through and is rotatably supported at either end by the housing, the arm 34 being located outside of the housing and fixed to the shaft 36 for rotation therewith. As shown best in FIG. 2, two stops 38, 38 are located in the path of movement of the arm 34, the stops being formed integral with the housing 32 and being spaced from each other by a given angular distance about axis of the shaft 36. The spacing of the stops illustrated in FIG. 2 is slightly less than 180°. Also included in the attenuation device and attached to the housing 32 is a centering motor 37 which includes an output member in the form of a pinion 40 located inside the housing.

In addition to the pinion 40 the housing 32 also contains a differential mechanism, indicated generally at 41, having as its output the shaft 36 and having two input members one drivingly connected with the servo motor 18 and the other drivingly connected with the centering motor 37. The differential mechanism may take various different forms, but in the illustrated case comprises a carrier 42 fixed to the shaft 36 and rotatably supporting two bevel gears 44, 44 for rotation about an axis fixed relative to the carrier. The two bevel gears 44, 44 in turn mesh with two other bevel gears 46 and 48 each axially fixed relative to the shaft 36 and supported for rotation about the axis of the shaft 36 independently of the shaft and of the carrier 32. The bevel gear 46 has fixed thereto a spur gear 50 and the bevel gear 48 has fixed thereto a similar spur gear 52. The spur gear 50 comprises one input to the differential mechanism and meshes with and is driven by the pinion 40. The spur gear 52 comprises the other input to the differential mechanism and is drivingly connected with the servo motor 18 by a train of gears 54, 56 and 58, which form a driving connection between the spur gear 52 and the gear 30 of the clutch 26, and by the gearing 24 which provides a driving connection between the gear 30 and the output pinion 22 of the servo motor 18. From the foregoing it will be obvious that the differential mechanism described is of a generally conventional construction and that the arm 34 which is fixed relative to the shaft 36 and carrier 42 will be driven in rotation about the axis of the shaft 36 at a speed dependent upon rotation about the axis of the shaft 36 at a speed dependent upon the speeds of both the motors 18 and 37.

In the operation of the hard-over attenuation device 14, the arm 34 is normally maintained within a small angular zone fixed with respect to the housing 32. Usually, as illustrated herein, this normal zone of the arm 34 is preferably located at or near the center of the angular distance between the two stops 38, 38, but this need not necessarily always be so. In normal operation of the device the servo motor 18 operates at a high rate of response, with small displacements relative to a given reference position, to move the output shaft 20 in response to stabilizing commands supplied by other parts of the control system. Superimposed on these small displacements may be larger long term displacements, such as may be required for a trim adjustment and which involve basically a shifting of the reference position about which the small stabilizing displacements occur. The small stabilizing movements of the servo motor also, through the differential mechanism, cause the arm 34 to be moved, but the gear ratio between the servo motor 18 and the arm 34 is such that these resulting movements of the arm will be confined to its normal zone provided no long term trim or similar output movements are commanded of the servo motor 18. Should the servo motor receive a command for a long term change in trim or other similar output movement involving a displacement large in comparison to the displacements required for maintaining stability, the arm 34 will be displaced by a distance carrying it outside of its range or zone of normal movement, and when this happens the centering motor 37 is operated to provide an input to the differential mechanism which moves the arm 34 in the opposite direction to return it toward its normal zone. The speed of the centering motor 37 and the speed ratios of the various gear trains are such that for normal trim adjusting or similar movements made at a safe speed by the servo motor 18 the centering motor 37 is able to keep up with the trim adjustment and to maintain the arm 34 at or close to its normal zone and out of contact with either of the stops 38, 38. Therefore, the attenuation device in no way interferes with normal safe operation of the servo motor.

The speed of the motor 37 is nevertheless also so selected that it is not able to keep up with very rapid and sustained movements of the servo motor and of the type which would cause the aircraft or other vehicle controlled thereby to undergo a hard-over maneuver. As a result, in the event of such an output by the servo motor the arm 34, despite the action of the centering motor 37, will be moved against one or the other of the stops 38, 38, thereby preventing further high speed movement of the servo motor and of the flight control member moved thereby. That is, engagement between the arm 34 and the contacted stop 38 physically restrains the high speed operation of the servo motor, and further movement of the output member 20, and of the flight control member connected therewith, occurs at a speed determined by and dependent on the speed of the centering motor 37. This speed of the centering motor in turn is or may be sufficiently slow as to prevent the aircraft or other vehicle from being placed in jeopardy and to give the pilot sufficient time to respond and to take over manual control of the aircraft or other vehicle. Also, if desired an interlock may be provided for disengaging the clutch 26, for de-energizing the servo motor 18 or for performing some other function in response to the engagement of the arm 34 with the stop 38. As shown in FIG. 2 such an interlock may include two limit switches 70, 70 fixed to the housing 32 each adjacent a respective one of the stops 38, 38 and arranged to be actuated by the arm 34 simultaneously, or at least substantially simultaneously, with the engagement of the arm with the associated stop.

The means for controlling the operation of the centering motor 37 may take various different forms, but in the device illustrated in FIG. 1 conveniently comprises two cams 60 and 62 fixed to the shaft 36, outside of the housing 32, for rotation with the shaft. Associated respectively with the cams 60 and 62 are two switches 64 and 66 each having a switch actuating arm including a roller which rides on the periphery of the associated cam. As shown each cam is preferably made of two plates placed side by side and angularly adjustable relative to each other to control the angular position of the shaft 36 at which the associated switch is operated. This adjustment means comprises a slot 68 in one of the discs and a screw 70 carried by the other disc and passing through the slot 68, the screw being capable of being loosened or tightened to permit or prevent angular movement of the slot containing plate relative to the screw carrying plate. The cams 60 and 62 and the associated switches 64 and 66 determine the normal range of movement or angular zone of the arm 34, and when the arm is moved outside of this angular zone one or the other of the switches is operated to energize the centering motor 37 and to cause it to rotate in such a direction as to tend to return the arm to its normal zone.

Figure 3:
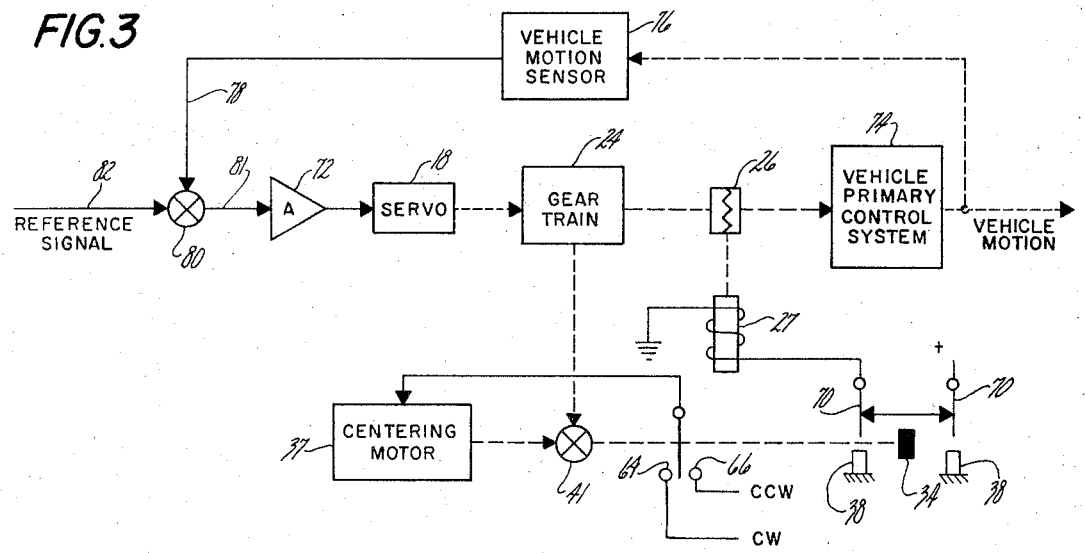
FIG. 3 is a block diagram of a control system employing the combination of FIG. 1.

The operation of the hard-over attenuation device as described above in connection with FIGS. 1 and 2 may perhaps be better understood by reference to the block diagram of FIG. 3 which illustrates a servo system including a hard-over attenuation device such as shown in FIGS. 1 and 2. Parts of the FIG. 3 system which correspond to parts shown in FIGS. 1 and 2 have been given the same reference numbers as in the latter figures even though shown only schematically in FIG. 3.

Except for the addition of the hard-over attenuation device, the system of FIG. 3 is generally conventional in nature. The servo loop in addition to the servo motor 18 incleuds an amplifier 72 and the vehicle primary control system, indicated by the block 74, which may be taken to be the ailerons, rudder or other final control element of the vehicle plus the linkage or other mechanism connecting such final control elements to the clutch 26. As a result of movement of the final control element, the vehicle will undertake a given motion, and this motion is in turn sensed by a vehicle motion sensor 76 which produces an output signal transmitted by the line 78 to a summing device 80. The summing device 80 operates to compare the signal on the line 78 with a reference signal appearing on the line 82 and produces an error signal transmitted to the amplifier 72, indicative of the deviation of the desired vehicle motion from the actual vehicle motion. The reference signal appearing on the line 82 is produced by another part of the control system, as for example by an auto pilot mechanism.

FIG. 3 shows the control system with the arm 34 of the hard-over attenuation device in a centered position between the stops 38, 38. If the reference signal appearing on the line 82 now remains substantially constant, the error signals appearing on the line 81 will usually be relatively small in value and the arm 34 will be moved only small distances from its illustrated position and not by an amount sufficient to close either the switch 64 or the switch 66. As the consequence, the centering motor 37 remains unoperated. Should a larger signal appear on the line 81, usually as a result of a change in the reference signal, and cause a larger movement of the servo motor 18, the arm 34 will now be moved by a greater amount and one or the other of the switches 64 and 66 will be closed. This in turn causes energization of the centering motor 37 for movement of the latter in either the clockwise or counterclockwise direction as necessary to tend to return the arm 34 toward its normal zone.

If the large displacement commanded of the servo motor 18 is commanded to occur at a relatively slow rate, the centering motor 37 will be able to keep up with the movement of the servo motor and will maintain the arm 34 at or near its normal zone and out of contact with either of the stops 38, 38. However, should the large displacement of the servo motor be commanded to occur at a very rapid rate, the centering motor will not be able to keep up with the movement of the arm 34, and the arm will be driven against one or the other of the stops 38, 38 to prevent further high speed operation of the servo motor. In the illustrated case, at the same time as the arm 34 engages one of the stops 38 it also engages and opens one of the switches 70, 70 to de-energize the solenoid 27 of the clutch 26 and to thereby disengage the clutch and break the driving connection between the gearing 24 and the vehicle primary control system 74. Preferably, the solenoid 27 is of the slow operate type, or the circuit therefor includes some other time delay, so that the clutch 26 is not disengaged until after the lapse of a predetermined period of time following the engagement of the arm 34 with the stop 38. Such a period of time may for example be on the order of 0.2 second. It should be understood, however, that the limit switches 70, 70 and the clutch disengaging interlock provided thereby are not always necessary and in some cases it may be desirable to use the mechanical limiting action of the stops 38, 38 and arm 34 without any such interlock. From the foregoing, it will be further understood that the action of the hard-over attenuation device is such as to limit the duration of the high speed output the servo motor 18, and that the operation of the device is dependent on both the speed of the servo motor and the duration of its high speed operation. The attenuation device will tolerate or permit high speed movements existing for only very short periods of time or involving only very small displacements, and will also tolerate or permit large displacements occurring at a slow and safe rate. Large displacements at a very fast rate are, however, prevented.

Figure 4:
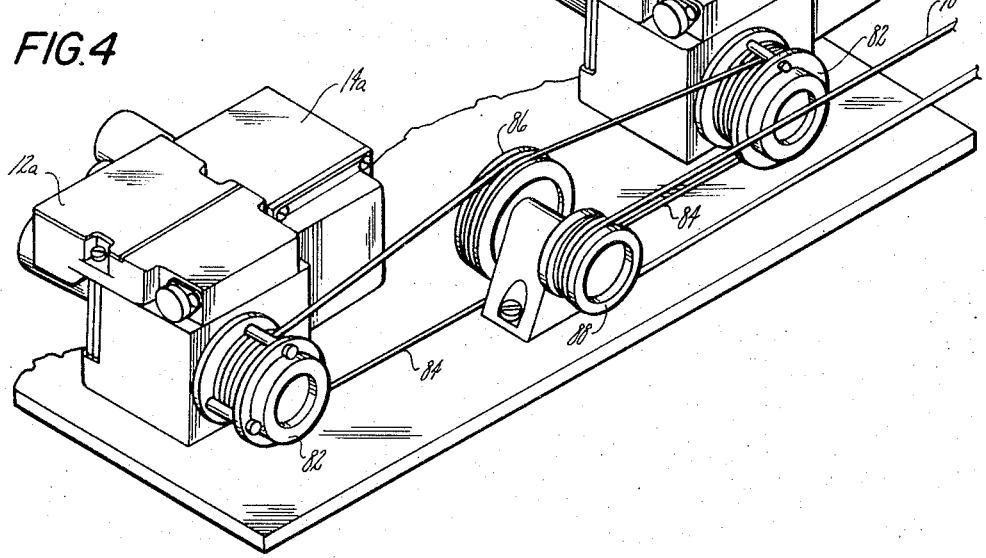
FIG. 4 is a perspective view showing a redundant control system employing the combination of FIG. 1.

The hard-over attenuation device described above also finds particular utility in connection with redundant servo systems wherein two servo actuators are connected in parallel to the vehicle primary control system, one actuator being an active actuator and the other being a standby actuator. Such a redundant system is shown in FIG. 4 wherein two servo actuators are shown at 12a and 12b and have associated therewith two hard-over attenuation devices 14a and 14b respectively. Each of the actuators includes a cable drum 82 which is drivingly connected by a cable 84 to a coupling sector 86. The coupling sector 86 is in turn fixed relative to an output sector 88 which drives a cable 90 connected with the vehicle primary control system. In this figure, the actuator 12a may be taken to be the active or operating actuator, and the actuator 12b may be taken to be the standby actuator. FIG. 5 shows in block diagram form a portion of a redundant system using operating and standby actuators such as shown in FIG. 4.

Referring to FIG. 5, parts of the actuators of the hard-over attenuators which are similar to the parts shown in FIGS. 1 and 2 have been given the same reference numerals as in the latter figures except that the suffixes a and b have been added to the reference numerals to distinguish between the operating and standby components. The reference signal appears on the line 92 and in this case is taken to be a digital signal. This digital signal is transmitted simultaneously to three digital to analog converters 93, 94 and 95. The two outputs of the digital to analog converters 93 and 94 are compared by a summing device 96 and the resultant signal is transmitted to a fault sensor 97. If both of the converters 93 and 94 are operating properly they should both have the same outputs. In this case the output of the summing device 96 will be zero and the fault sensor 97 will be conditioned to maintain an associated solenoid 98 in its illustrated nonactuated condition. Associated with the solenoid 98 is a switch 100 which is normally in the position shown whereat the output of the converter 93a is transmitted to both the input summing device 80a of the operating system and the input summing device 80b of the standby system. Should one or the other of the converters 93 and 94 malfunction, the summing device 96 will detect the difference in the output signals therefrom. An error signal different from zero is accordingly produced and applied to the fault sensor 97, thereby energizing the solenoid 98 and causing the latter to change the state of the switch 100, thereby connecting the third digital to analog converter 95 to the input summing devices 80a and 80b. It will therefore be understood that the illustrated arrangement of the digital to analog converters 93, 94 and 95, together with the fault sensor 97, solenoid 98 and switch 100 is such as to provide redundancy with regard to the digital to analog converters, the converter 95 being substituted for the converter 93 in the event of malfunctioning of either the converter 93 or the converter 94.

Referring to the remaining portion of the operating system shown in FIG. 5, it will be noted that this system is generally similar to the system illustrated in FIG. 3 except that the potentiometer 28a is utilized to provide a position feedback signal to the summing device 80a. From this it will be understood that the attenuation device operates in the same manner as described above in connection with the FIG. 3 system, and when the servo motor 18a is operated for some time at a high rate of speed, one or the other of the limit switches 70a, 70a will be moved from its illustrated position, whereat the solenoid 27a is energized to a position whereat the solenoid 27b is energized. That is, as soon as the arm 34a engages one or the other of the limit switches 70a, 70a the clutch 26a is disengaged to deactivate the operating servo motor 18a and the clutch 26b is engaged to activate the standby servo motor 18b. Since in this case the control of the aircraft is switched immediately from the operating servo motor to the standby servo motor, the hard-over attenuation device of the operating system need not necessarily include the limit stops 38, 38 and instead the limit switches 70a, 70a may, if desired, be used by themselves.

Turning to the standby portion of the FIG. 5 system, this part of the system is similar to that shown in FIG. 3 except that the potentiometer 28b is used to provide a position feedback signal to the input summing device 80b and except that it includes no limit switches such as those shown at 70, 70 in FIG. 2. Such switches could, however, be provided if desired.

In the operation of the FIG. 5 system it will be understood that in the event of a rapid and sustained output movement of the servo motor 18a, the associated hardover attenuation device will operate to disengage the clutch 26a and to engage the clutch 26b to deactivate the operating system and to activate the standby system. Thereafter, should the servo motor 18b of the standby system operate at too rapid a rate for a prolonged duration of time, the limit stops 38b, 38b of the associated hard-over attenuation device will be engaged to prevent the motor 18b from immediately undergoing further high speed operation.

The invention claimed is:

1. The combination with a servo actuator having an output member of a means for attenuating the duration of the high speed operation of said actuator, said means comprising an arm supported for movement about a given axis, two stops located in the path of movement of said arm and spaced a given angular distance from each other with respect to said axis, said stops being engageable with said arm to mechanically arrest its movement and to accordingly limit the range of movement of said arm relative to said stops to said angular distance, first drive means mechanically connected with said servo actuator for effecting relative rotation between said arm and said stops in response to movement of said servo actuator output member, a centering motor, second drive means connected with said centering motor for effecting relative rotation between said arm and said stops in response to operation of said centering motor, and means for operating said centering motor in response to movement of said arm in either direction beyond the limits of a given angular zone located between said stops and of substantially less angular extent than said angular distance between said stops.

2. The combination as defined in claim 1 further characterized by said given angular zone having its center located substantially at said center of the angular distance between said two stops.

3. The combination with a servo actuator having an output member of a means for attenuating the duration of the high speed operation of said actuator, said means comprising a housing, an arm supported for movement about a given axis fixed relative to said housing, two stops located in the path of movement of said arm and spaced equal angular distances on either side of a center position fixed relative to said housing, said stops being engageable with said arm to mechanically arrest its movement and to accordingly limit the range of movement of said arm relative to said stops to the angular distance between said stops, a centering motor, a differential drive mechanism having an output member connected with said arm for driving the same about said given axis and also having two input members, means drivingly connecting said servo actuator with one of said input members of said differential drive mechanism, means drivingly connecting said centering motor with the other of said input members, and means for operating said centering motor in response to movement of said arm in either direction beyond the limits of a given angular zone fixed relative to said housing and located between said stops, said angular zone being of substantially less angular extent than said angular distance between said stops.

4. The combination as defined in claim 3 further characterized by said given angular zone being substantially centered relative to said angular distance between said two stops.

5. The combination as defined in claim 3 further characterized by said differential mechanism being a geared mechanism and being contained in said housing.

6. The combination as defined in claim 3 further characterized by said stops being fixed relative to said housing.

7. The combination as defined in claim 3 further characterized by a pair of switches each located adjacent a respective one of said stops so as to be actuated by said arm when said arm engages said stop, and means for deactivating said servo actuator in response to actuation of either one of said switches.

8. The combination as defined in cliam 7 further characterized by said means for deactivating said servo actuator comprising an electro-mechanical clutch drivingly connected with said output member of said servo actuator, and circuit means for controlling the energization of said clutch in accordance with the state of said switches.

9. The combination as defined in claim 3 further characterized by said means for operating said centering motor including a cam rotated about said given axis in unison with said arm, and a switch fixed relative to said housing and operated by said cam.

10. The combination as defined in claim 3 further characterized by said means for operating said centering motor including a cam means rotated about said given axis in unison with said arm, two switches fixed relative to said housing and operated by said cam means, said cam means having such a shape that one of said switches is actuated in response to movement of said arm in one direction beyond said given distance from said given position and that the other of said switches is actuated in response to movement of said arm in the other direction beyond said given distance from said given position, and circuit means connected with said centering motor and with said switches for causing said centering motor to run in one direction in respones to the actuation of one of said switches and to run in the other direction in response to the actuation of the other of said switches.

11. The cmbination with a servo actuator having an output member of a means for attenuating the duration of the high speed operation of said actuator, said means comprising a housing, an arm supported for movement about a given axis fixed relative to said housing, two switches spaced equal angular distances on either side of a center position and each of which is fixed relative to said housing and arranged so as to be actuated by said arm when said arm reaches the position thereof, a centering motor, a differential drive mechanism having an output member connected with said arm and also having two input members, means drivingly connecting said servo actuator with one of said input members of said differential drive mechanism, means drivingly connecting said centering motor with the other of said input members, means for operating said centering motor in response to movement of said arm in either direction beyond the limits of a given angular zone located between said two stitches and of substantially less angular extent than the angular distance between said switches, and means for deactivating said servo actuator in response to actuation of one of said switches.

12. The combination as defined in claim 11 further characterized by said means for deactivating said servo actuator comprising an electro-mechanical clutch drivingly connected with said output member of said servo actuator, and circuit means for controlling the energization of said clutch in accordance with the state of said switches.

13. The combination as defined in claim 11 further characterized by said means for operating said centering motor including a cam rotated about said given axis in unison with said arm, and a switch fixed relative to said housing and operated by said cam.

References Cited
UNITED STATES PATENTS

| | | |
|---|---|---|
| 3,201,675 | 8/1965 | Curran et al. |
| 3,259,823 | 8/1965 | Miller. |

ORIS L. RADER, *Primary Examiner.*

THOMAS E. LYNCH, *Examiner.*